United States Patent
Wu et al.

(10) Patent No.: US 7,080,296 B2
(45) Date of Patent: Jul. 18, 2006

(54) METHOD FOR MANAGING DEFECTS ON AN OPTICAL DISK

(75) Inventors: Tse-Hong Wu, Tai-Nan (TW); Yuan-Ting Wu, Hsin-Chu (TW); Ming-Hung Lee, Taipei Hsien (TW)

(73) Assignee: MediaTek Inc., Hsin-Chu (TW)

( * ) Notice: Subject to any disclaimer, the term of this patent is extended or adjusted under 35 U.S.C. 154(b) by 749 days.

(21) Appl. No.: 10/248,110

(22) Filed: Dec. 19, 2002

(65) Prior Publication Data
US 2003/0223329 A1 Dec. 4, 2003

(30) Foreign Application Priority Data
May 28, 2002 (TW) .................................. 91111374

(51) Int. Cl.
*G11C 29/00* (2006.01)
(52) U.S. Cl. ..................................... 714/710; 369/47.14
(58) Field of Classification Search ................ 711/115, 711/1; 369/47.1, 47.14, 30.21, 47.3; 714/710
See application file for complete search history.

(56) References Cited

U.S. PATENT DOCUMENTS

| | | | | |
|---|---|---|---|---|
| 4,498,146 A | * | 2/1985 | Martinez | ..................... 711/115 |
| 5,721,856 A | * | 2/1998 | Takeuchi | ........................ 711/1 |
| 6,606,285 B1 | * | 8/2003 | Ijtsma et al. | ................ 369/47.1 |
| 6,724,701 B1 | * | 4/2004 | Ijtsma et al. | .............. 369/47.14 |
| 6,973,014 B1 | * | 12/2005 | Ihde | ........................ 369/30.21 |
| 6,992,957 B1 | * | 1/2006 | Hayashi et al. | ............ 369/47.3 |

* cited by examiner

*Primary Examiner*—David Ton
(74) *Attorney, Agent, or Firm*—Winston Hsu

(57) ABSTRACT

A method comprises utilizing an optical disk drive to manage defects on an optical disk. When a targeted block is defective, the method writes all data in an original packet to an alternative packet without temporarily storing the data in a memory of the optical disk drive, thereby saving memory resources.

10 Claims, 10 Drawing Sheets

METHOD FOR MANAGING DEFECTS ON AN OPTICAL DISK

BACKGROUND OF INVENTION

1. Field of the Invention

The present invention relates to an optical disk, and more specifically, to a method of defect management for an optical disk.

2. Description of the Prior Art

Optical disks, given their compact size, high capacity storage, and low price have rapidly become one of the most dominant, permanent storage media in our contemporary information society. The development of CD-W has made it possible for users to write data onto an optical disk in accordance with their own specific needs, which affords CD-W a higher degree of flexibility in application. For their part, the information technology industry has been devoted to the research and development of various technologies to make CD-W even more reliable and durable.

Please refer to FIG. 1, which shows a schematic diagram of a typical optical drive 10. The optical drive 10 comes equipped with a spindle 14 to carry an optical disk 22, a motor 12 that drives the spindle 14, a read/write head 16 that accesses data on the optical disk 22, a control circuit 18 that controls the operation of the optical drive 10, and a memory 20 (such as dynamic random access memory, DRAM) that serves as a temporary storage device to record all relevant data during the operation of the control circuit 18.

The data on the optical disk 22 is recorded sequentially on a track 24 through pit and land markings. When the optical disk drive 10 is ready to write data onto the disk 22, the drive 10 first stores the intended data in the memory 20 before writing it onto the disk 22. The read/write head 16 meanwhile checks for defects on the disk 22 and passes on a check result to the control circuit 18.

Often due to defects stemming from scratch marks, variation in material properties, or interference from dust, we cannot write data onto an optical disk. To improve the reliability of re-writable optical disks, the information technology industry has committed itself to research and development efforts in optical disk defect management. For instance, one recent development is the introduction of compact disk Mount Rainier re-writable (CD-MRW) format, which sets aside spare areas (SAs) on an optical disk. When certain parts of the disk become defective, which renders data storage unworkable, CD-MRW redirects the target data for storage to an SA. Please refer to FIG. 2 and FIG. 1. FIG. 2 is an illustration of a format for the typical optical disk 22. In this format, the data track 24 of the optical disk 22 is divided into several main areas. These include a lead-in area LI, a program area PA, and a lead-out area LO. The lead-in area LI and lead-out area LO are used respectively to designate the beginning and ending of the track 24. The program area PA is primarily used to record the data that is to be written onto the optical disk 22. In the lead-in area LI a main table area MTA is established for the storage of a defect table DT. The program area PA is further divided into pre-gap P0, a general application area GAA, and a secondary table area STA, along with a plurality of data areas DA(1) to DA(N) and their corresponding spare areas SA(1) to SA(N). In the secondary table area STA a back-up of the defect table DT is stored. Each data area DA(1)–DA(N) is further divided into a pre-determined number of packets Pd, which comprise a pre-determined number of user data blocks Bd. Each spare area SA is also divided into a pre-determined number of packets Ps, which comprise a pre-determined number of spare data block Bs. The user data blocks Bd and spare data blocks Bs are all of the same data storage capacity and are data writable. For instance, under the CD-MRW format, each data area DA has 136 packets Pd, and each packet Pd comprises 32 data blocks Bd. In each spare area SA there are 8 packets Ps, and each packet Ps has in place 32 spare data blocks Bs. All these data locations have fixed addresses to identify their locations on the track 24.

To write user data onto an optical disk as specified in FIG. 2, the optical drive 10 treats each data block Bd as a basic unit, writing data on to each data block Bd within a packet Pd in an orderly fashion. For instance, when every data block Bd in the data area DA(1) contains user data, any subsequent data would be directed to an available data block Bd in the data area DA(2). By contrast, spare areas SA are not needed for data storage during the normal write-in process. However, should a data block Bd become defective during write-in, an available spare data block Bs within a spare area SA would become the location for data storage. If the spare data block Bs also turns out to be defective during the write-in, then another available spare data block Bs would have to be located for the original data storage. By applying this format and method of operation, an accurate data write-in is guaranteed, and the data storage capability of an optical disk is not compromised due to a partial defect of an optical disk. The address of the defective blocks Bd and Bs are recorded in the defect table DT. And when the optical disk drive 10 tries to read the data in the defective blocks Bd or Bs, the control circuit 18 follows the instructions from the defect table DT to where the spare data block Bs is located and access the corresponding data.

During write-in, the optical drive 10 is capable of detecting whether or not a single data block Bd or Bs in a packet Pd is defective. However when the optical drive 10 writes to disk 22, it uses the packet Pd as a basic unit. In other words, it must write the entire data block Bd into a packet Pd on the track 24. As previously discussed, data intended for defective data blocks Bd or Bs would be redirected to another spare block Bs. Hence, the optical drive 10 follows a certain process in writing the entire packet Pd that contains the target data block Bd onto the optical disk 22. Please refer to FIG. 3 (in conjunction with FIG. 1). A flowchart illustrates a process 100 with which the target block Bd or Bs is written onto the disk 22 as part of a packet Pd unit. The process 100 of the flowchart comprises the following steps:

Step 102:

Begin. When the control circuit 18 of the optical drive 10 is about to write data to a block Bd or Bs, which happens to be defective, the process 100 is executed to redirect the target data to another block Bs in the disk 22;

Step 104:

Amongst all available packets Ps in every spare area SA, search for a spare block Bs that is data-writable;

Step 106:

Once a suitable spare block Bs is located, a memory space is allocated in the memory 20 of the optical disk drive 10, which then temporarily records all data in the data blocks of the packet Ps that contains the spare block Bs;

Step 108:

After reading data of the packet Ps that contains the spare block Bs from the memory 20, the optical disk drive 10 adds the target data to this packet Ps, which is then written onto the optical disk 22. As mentioned earlier, since the optical disk drive 10 uses the packet Ps as a basic data unit, it is necessary for the optical disk drive 10 to read all the data included in the packet Ps that contains the spare block Bs, then add in new data, and finally write the packet Ps onto the optical disk 22;

Step 110:

While writing data onto the disk 22, should the optical disk drive 10 detect new defects, step 102 is executed; otherwise continue with step 112;

Step 112:

After the successful write-in of the entire packet Pd onto the disk 22, the data in memory 20 is no longer needed. Of course, the addresses for the defective block Bd and spare block Bs are recorded respectively in the defect table DT. The defect table DT can be temporarily stored in the memory 20 during the optical disk drive 10 write-in;

Step 114:

If additional defect processing is needed, then return to step 102; otherwise continue to step 116; Step 116: End.

To further explain the aforementioned process, please refer to FIG. 4A and FIG. 4B (in conjunction with FIG. 3). FIG. 4A and FIG. 4B illustrate respectively what occurs in the track 24 of the optical disk 22 and in the memory 20 of the optical disk drive 10 during data storage. As illustrated in FIG. 4A, suppose data Bd0 is to be written to a user data block Bd1 of a packet Pd1 in the track 24. The block Bd1 is found to be defective, and thus the process 100 is executed. Suppose step 104 locates a write-in-ready spare data block Bs2 in the packet Ps1, and step 106 reads all data blocks in packet Ps1 into the memory 20. Then, in step 108, the data Bd0 is added to the packet Ps1, which is temporarily stored in the memory 20. As a result, the previously empty spare data block Bs2 now includes the data Bd0. In FIG. 4B, step 108 continues to write the packet Ps1, which includes new data, onto the track 24 of the optical disk 22. If no further defects are found during the write-in, FIG. 4B illustrates what follows a successful write-in. The data Bd0, which was intended for defective block Bd1, is written into the spare block Bs2. The packet Ps1 temporarily stored in the memory 20, as illustrated in FIG. 4A, is released during step 112, which frees up the memory space. As for the packet Ps1 on the track 24, although all spare data blocks have been rewritten (due to the requirement that optical disk drives must conduct writing in units of packets), the only new addition is the data Bd0 with the data read in step 106.

The process 100 illustrated in the flowchart of FIG. 3 is capable of reading the packet Pd that contains the spare data block from the memory 20 of optical disk drive 10, which adequately reconciles the difference between the write-in mechanism of the optical disk drive 10 with the defective/ compensation mechanism (the former is based on packets and the latter is based on blocks). So every individual spare data block could replace a defective data block without squandering the entire packet in a spare area. As illustrated in FIG. 4A and FIG. 4B, blocks Bs0 and Bs1 of packet Ps1 may store data intended for other packets (other than packet Pd1), and may not record packet data that includes Bd0.

However, process 100 of the flowchart of FIG. 3 does have weakness. When there are numerous defects on the disk 22, the process can cause a major drain on the memory 20 precipitating a memory shortage, sometimes to the point of incapacitating a computer system. Please refer to FIG. 5, which illustrates defect management and memory 20 operation in the case of multiple defects on an optical disk. Similar to the initiation phase in FIG. 4A, suppose data Bd0 is to be written to the data block Bd1 of the packet Pd1, and block Bd1 happens to be defective. After locating a spare data block Bs2 in the packet Ps1, step 106 of the process 100 reads data in the packet Ps1 into the memory 20. Wherein step 108 adds data Bd0 to the data of the packet Ps1, and writes the updated data stored in the memory 20 back to the packet Ps1 on track 24. In contrast to FIG. 4A and FIG. 4B, suppose that during write-in the block Bs1 of the packet Ps1 is found to be defective. At this point, the process 100 returns to step 102 to manage defective data block Bs1. Suppose that during step 104 a spare data block Bs5 is located in the packet Ps2 to replace the defective block Bs1. Then in step 106 a new packet is allocated to memory 20 to accommodate all data in the packet Ps2, followed by step 108 where data in block Bs1 is added to the packet Ps2, which is then written back onto track 24. Now suppose during write-back a data block Bs4 in the packet Ps2 turns out to also be defective, the process 100 returns to step 102, trying to locate a spare data block for defective block Bs4. Assume that a data block Bs8 in a packet Ps3 is to replace the defective block Bs4, which means that during step 106 another memory space is allocated to read data in the packet Ps3 to the memory 20. Then in step 108, data in the block Bs4 is added to the packet Ps3, which is temporarily stored in the memory 20, and an updated packet Ps3 is again written onto track 24 of the optical disk 22. Notice that even if the write-back is successful, the process 100, after releasing Ps3 from the memory 20 (step 112), still needs to keep packets Ps2 and Ps1 in the memory 20. The reason being that, replacement data blocks have yet to be located for the previously discovered defective data blocks Bd1 and Bs1. Hence, the process 100, after finished with the defective data block Bs4, still needs to return to step 102 from step 114 to re-process defective data block Bs1. After locating the replacement data block for defective block Bs1, a space is allocated in memory 20 to read in all data in the packet containing the replacement data block for trying to write back onto the track 24 after updating.

Based on the aforementioned discussion we can conclude that when there are multiple defects on an optical disk, the process 100 shown in the flowchart of FIG. 3 requires a large amount of memory space to work with. Every time the process 100 tackles a defective data block, a packet containing a plurality of data blocks is allocated in the memory 20 to read in all the data in the packet. If more defects occur on an optical disk, the process 100 easily uses up a huge amount of space in the memory 20, which causes execution of any forthcoming operations of the optical disk drive 10 to be very difficult.

With the prior art technology, it takes an entire packet of memory space to manage a defective data block. Once defects become abundant on an optical disk, this causes a tremendous drain on memory space and resources, adversely affecting the efficiency of the optical disk drive.

SUMMARY OF INVENTION

A primary objective of the present invention is to provide an efficient way of managing defects on an optical disk to overcome the deficiency in the prior art technology.

Briefly summarized, the present invention directly searches for a replacement packet having unoccupied data blocks and writes a packet, which would be temporarily stored in a memory during defect management, directly to the replacement packet. This saves any need to read replacement packets to the memory, thereby reducing resources required from the memory and retaining continuous effectiveness of an optical disk drive.

It is an advantage of the present invention that the defect management method for the optical disk is more efficient than the prior art. In particular, this advantage is obvious when there are multiple defects on the optical disk and the memory does not have enough resources to engage in data block-based defect management.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
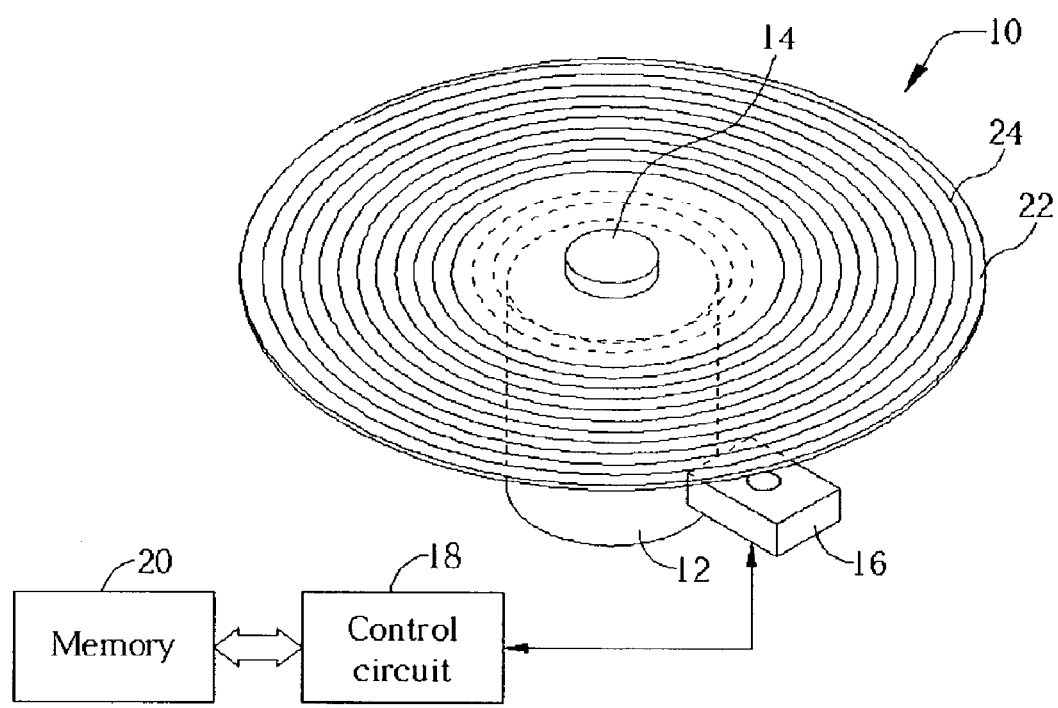
FIG. 1 is a schematic diagram of a typical optical disk drive.
Figure 2:
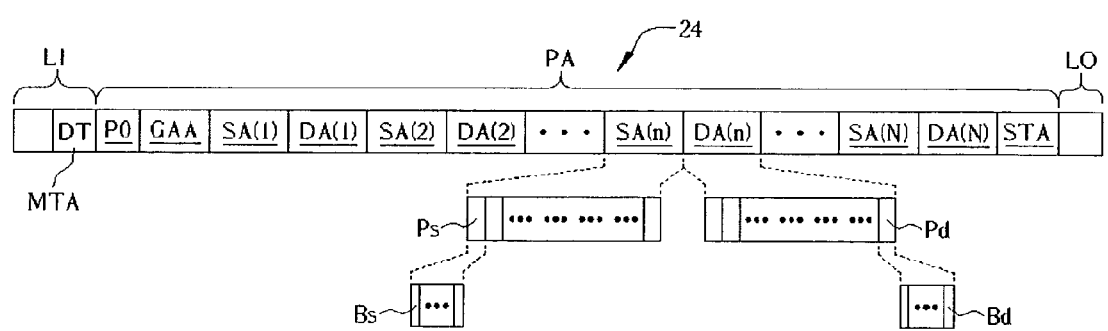
FIG. 2 is a track format illustration of the optical disk of FIG. 1.
Figure 3:
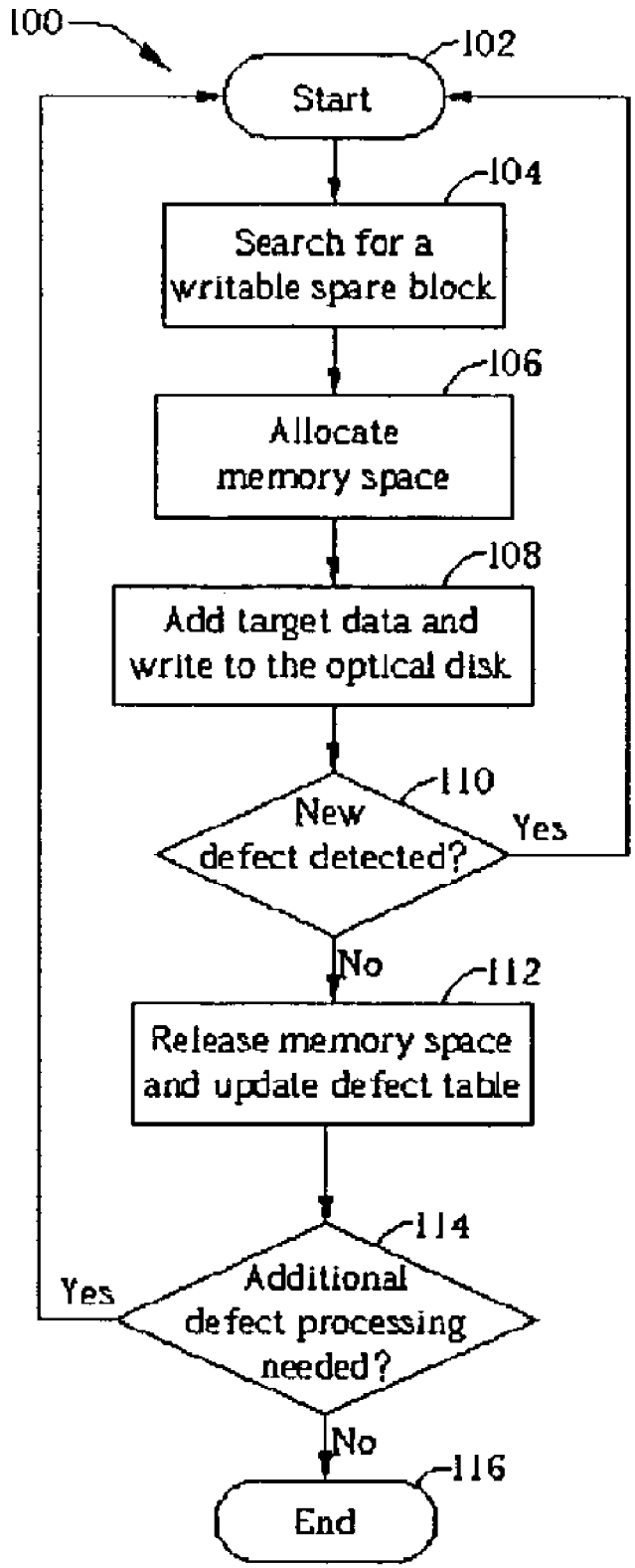
FIG. 3 is an optical disk defect management flowchart according to the prior art.
Figure 4A:
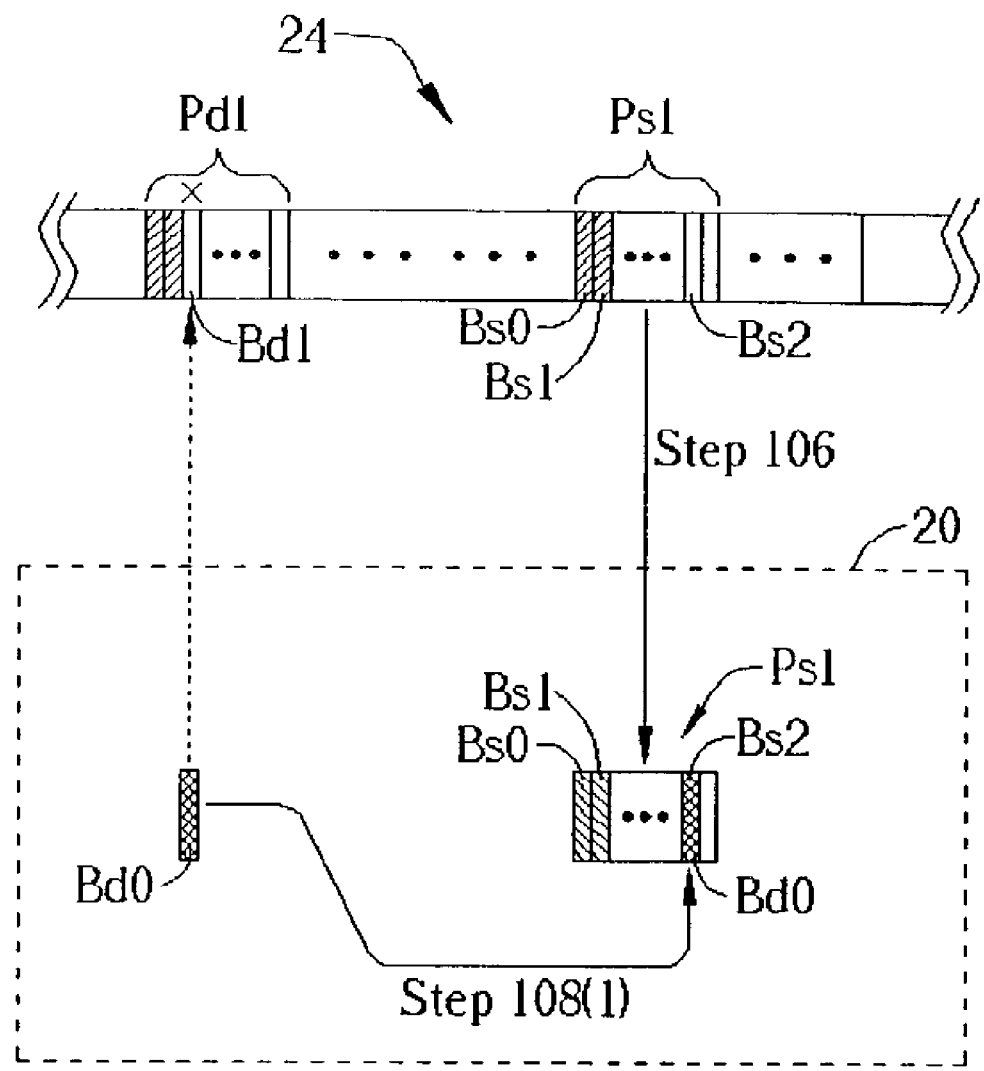
FIG. 4A and FIG. 4B illustrate data management during the process shown in FIG. 3.
Figure 4B:
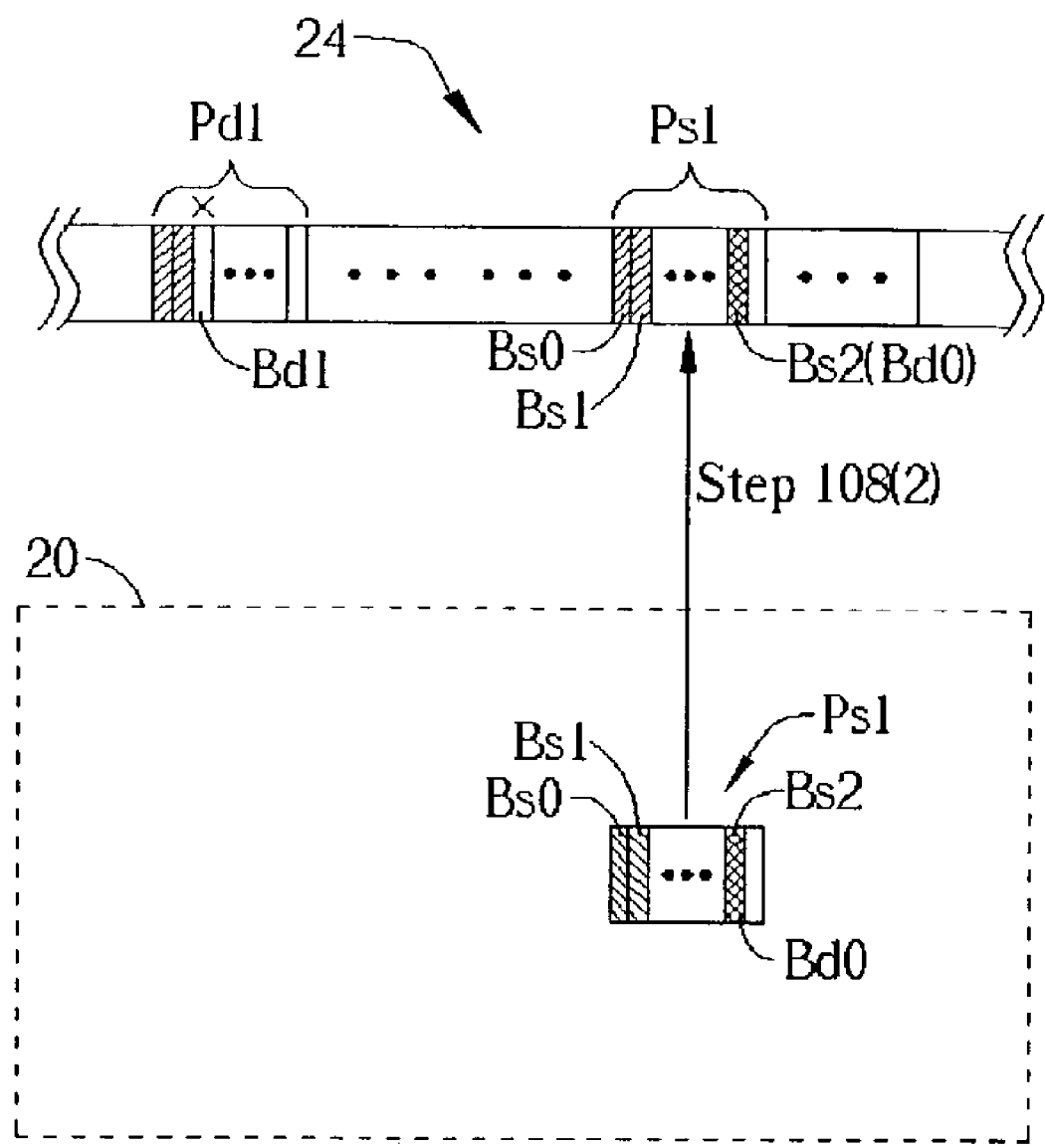
Figure 6:
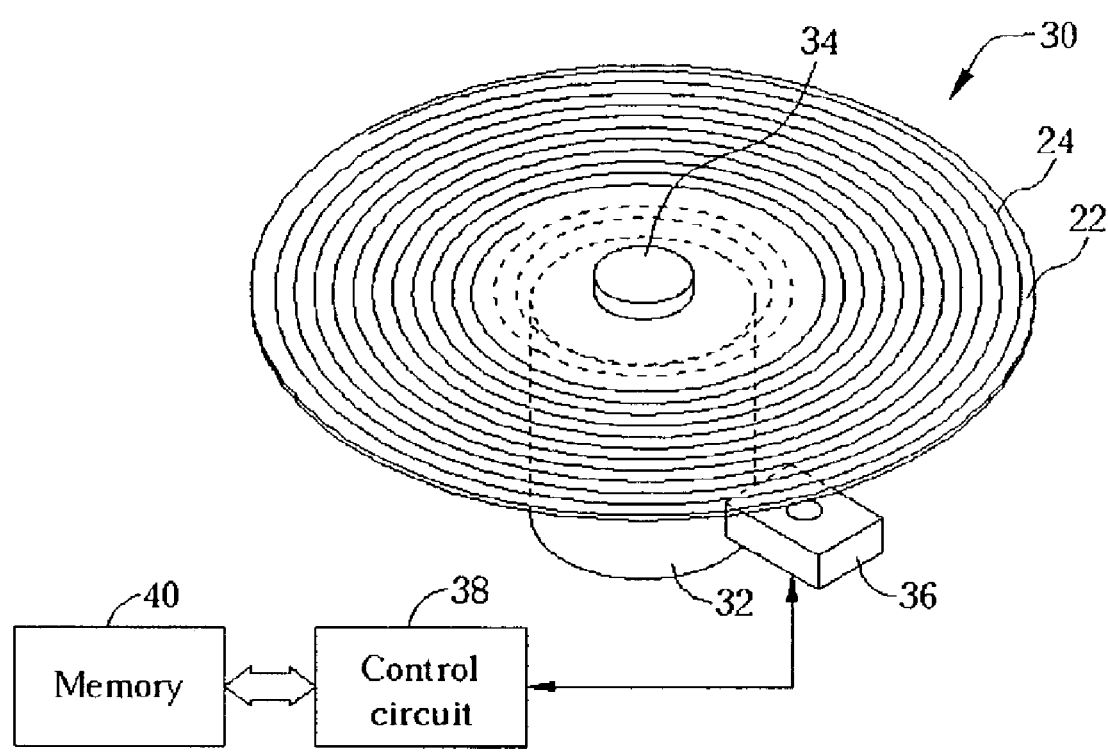
FIG. 6 is a schematic diagram of an optical disk drive according to the present invention.

Please refer to FIG. 6. The present invention is applicable to a typical optical disk drive 30 as illustrated in FIG. 6. The optical disk drive 30 includes a spindle 34 that carries an optical disk 22, a motor 32 that drives the spindle 34 and the optical disk 22, a read/write head 36 that accesses data on the optical disk 22, a control circuit 38 that manages operation of the optical disk drive 30, and a memory 40 that provides temporary storage for operational data of the control circuit 38. The read/write head 36 is capable of detecting defects on the disk 22 during data write-in onto a data track 24 of the disk 22, and sending a detection result back to the control circuit 38, which initiates a process for defect management. The data format of the disk 22 and the data track 24 were previously discussed with reference to FIG. 2 and repeated description is omitted. When the optical disk drive 30 writes data onto the disk 22, it uses a packet as a basic data unit.

Figure 7:
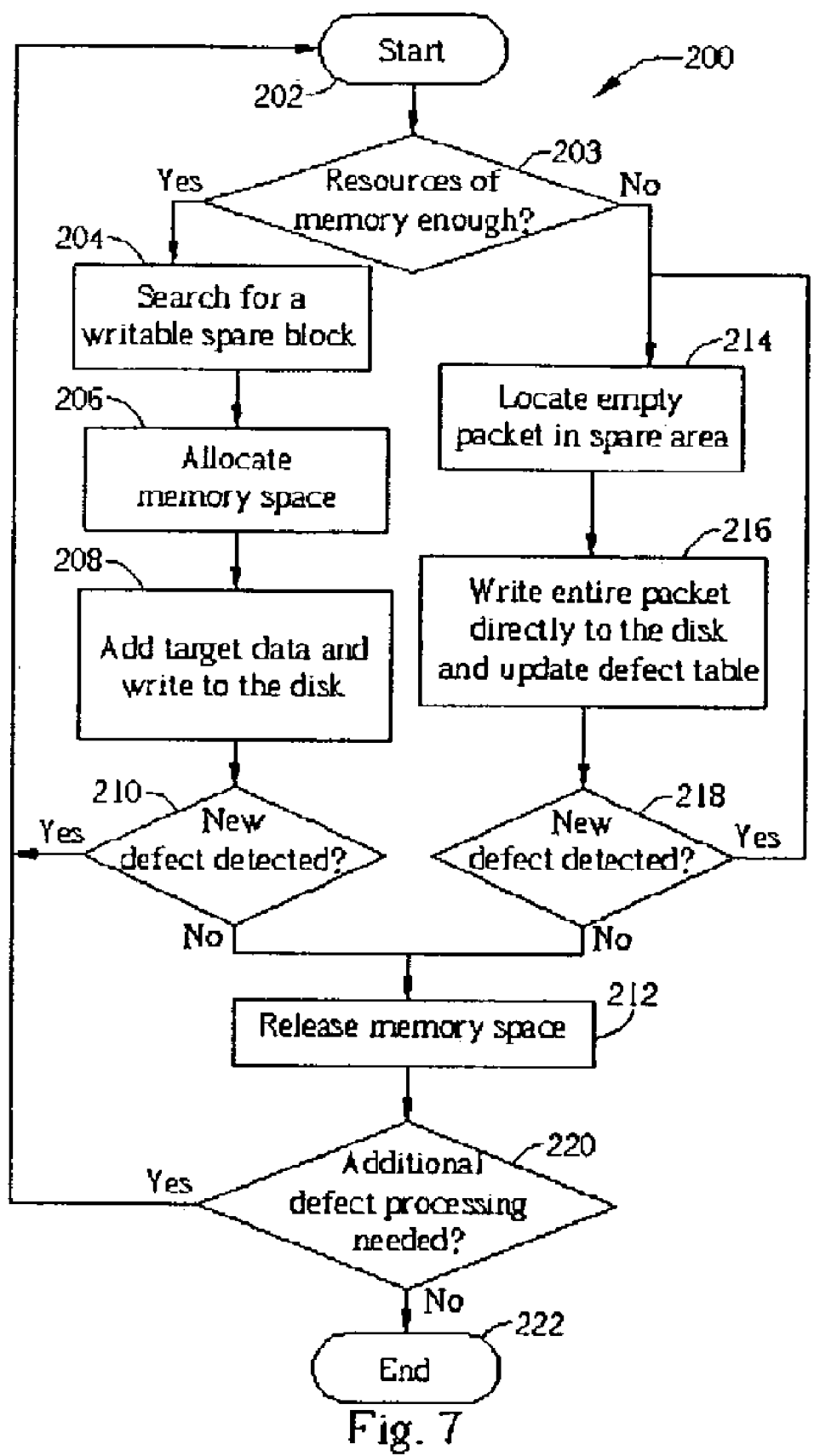
FIG. 7 is an optical disk defect management flowchart according to the present invention.

Please refer to FIG. 7, which is a flowchart of a defect management process 200 according to the present invention. When a defect is uncovered during write-in to the optical disk 22, the control circuit 38 executes the process 200, which comprises the following steps:

Step 202:

Start. When the optical disk drive 30 uncovers a new defective data block during write-in, the process 200 begins;

Step 203:

Determine whether or not the memory 40 has enough resources to engage in data block-based defect management. As mentioned earlier, if a spare data block is to replace a defective data block, the spare data block would have to be stored in memory 40, which would use up memory resources. If memory resources are adequate to tackle defect management, then proceed to step 204; if not enough memory remains, continue to step 214. Whether or not the memory 40 has adequate resources is decided by how much memory space is left during this step. If the remaining memory space is not enough to allocate a data packet, proceed to step 214. If the memory space taken up by a packet already surpasses a pre-determined value, meaning that during the disk write-in there are several consecutive occurrences of defective data blocks (similar to the situation illustrated in FIG. 5), then begin step 214;

Step 204:

Progressing to this step means that there are still ample memory resources with which to allocate a single spare data block to replace the defective one. Thus, start searching for an available data block in the track 24 of the disk 22 for defect management. All following steps, including 206, 208, 210, and 212 are similar to their counterparts in the process 100;

Step 206:

The memory 40 allocates a space to record the data packet that contains the spare data block located in step 204;

Step 208:

Data of the defective data block is added to the packet that is in temporary memory storage, and the updated packet is written back onto the optical disk 22;

Step 210:

During write-in in step 208, if new defective data blocks are uncovered, return to step 202 for defect management; otherwise continue to step 212;

Step 212:

After disposing of the defective data block, the packet in temporary storage is then released from the memory 40, freeing up memory space. However, for as yet undisposed of defective data blocks, all related data packets remain in temporary storage in the memory 40;

Step 214:

Progressing from step 203 to this step means that there is a shortage of space in the memory 40 and the use of single spare data block to replace a defective data block is not recommended. Under this circumstance, the present invention specifically utilizes steps 214 and 216 to ensure that defect management can effectively be carried out in the case of a memory shortage. In track 24 an available packet in a spare area is located, wherein all of the spare data blocks in this packet are fresh (having never been used to replace a defective data block);

Step 216:

Write the packet that contains the defective data block from memory 40 to the packet located in step 214. As mentioned earlier, consecutive defect discoveries leads to a memory shortage (similar to case illustrated in FIG. 5). The data that was meant for the defective data block as well as all of the data in the same data packet are already temporarily stored in the memory 40. Consequently, the entire packet in the memory 40 is written directly to the fresh data packet on the disk track 24. Since all of the spare data blocks of the packet located in step 214 are not replacements for defects, it is not necessary to allocate space in the memory 40 for storage prior to writing data to the packet. As a result, memory resources are saved, which prevents defect management from taking up memory resources causing a lowering of the optical disk drive 30 efficiency. Meanwhile, the original defective data block, along with all of the data blocks in the packet, are registered as defects in the defect table (please refer to FIG. 2 and its description) to be replaced by the data blocks of the blank packet in step 214. In other words, the original defective data block and other blocks in the packet are deemed as defective data blocks, to be replaced by spare data blocks of the packet in step 214;

Step 218:

If new defects are uncovered during the write-in of step 216, return to step 214, and continue using the whole packet to replace the packet in temporary memory storage. If the write-in of step 216 progresses successfully, proceed to step 212. If fresh defects are uncovered on the optical disk during step 216, and memory resource not sufficient to allocate single spare data blocks to replace a defect data block, return to step 214;

Step 220:

After freeing up memory space in step 212, if more defect management is still pending, return to step 202. Since the memory 40 now has more space to work with, it is decided in step 203 again how best to tackle defect management. If all defects are taken care of, proceed to step 222;

Step 222: End of Defect Management.

Figure 5:
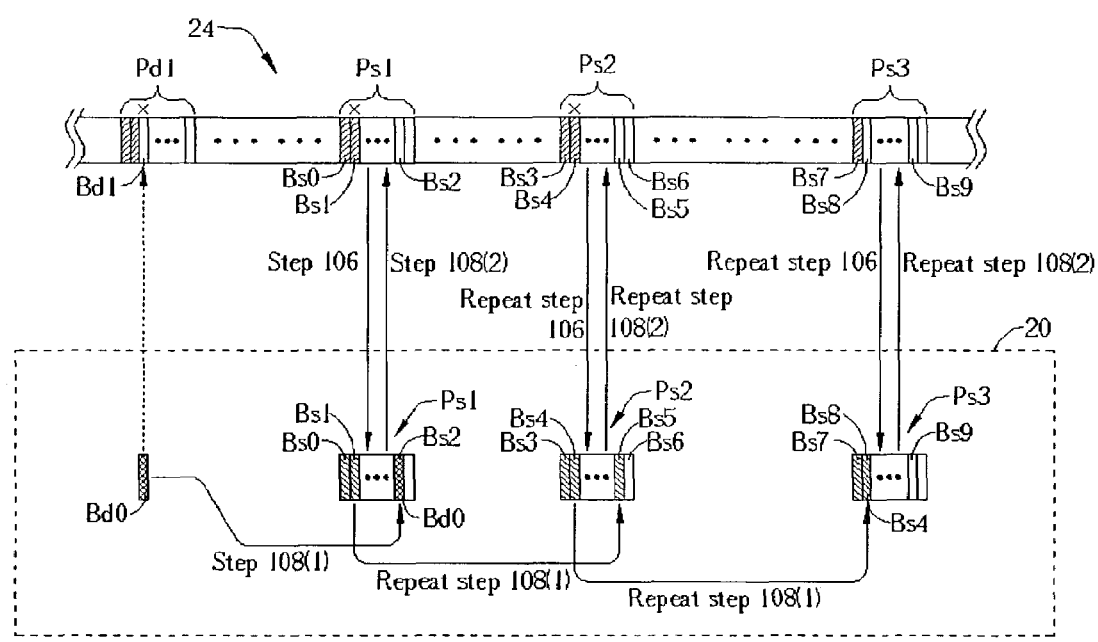
FIG. 5 illustrates data management during the process shown in FIG. 3 under a different set of circumstances.
Figure 8:
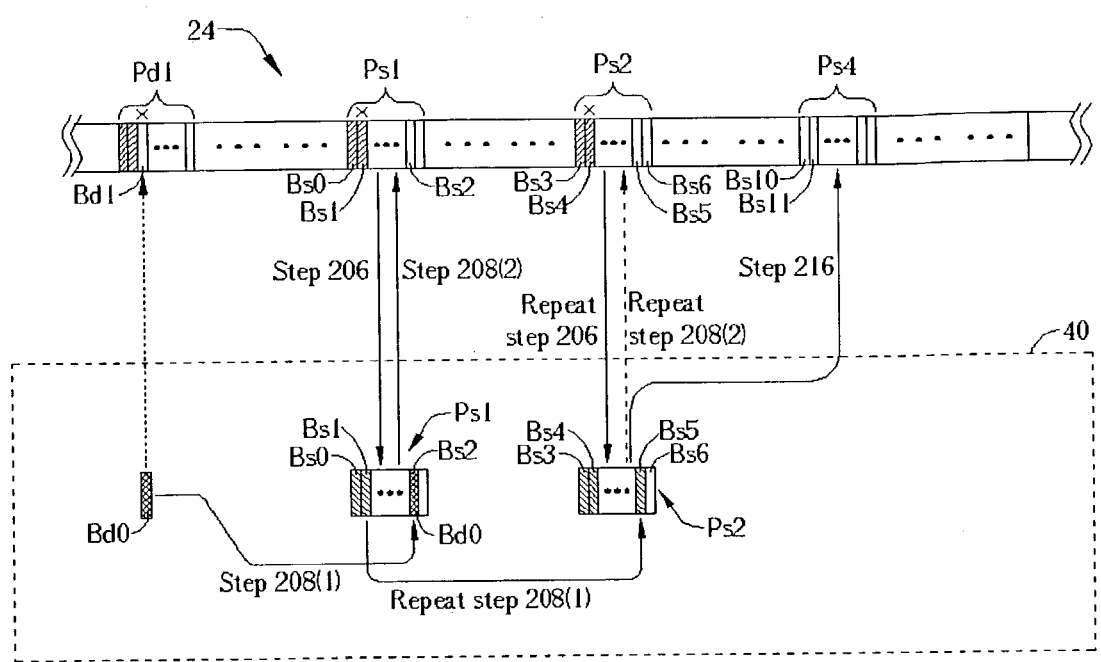
FIG. 8 and FIG. 9 illustrate relevant data allocation during the process of FIG. 7.

To further elaborate the operation of process 200, please refer to FIG. 8. FIG. 8 illustrates storage and management of relevant data during defect management of the present invention method. As illustrated in FIG. 8, if the optical disk drive 30 discovers a data block Bd1 is defective when it tries to write data Bd0 to the block Bd1, the process 200 is initiated. Assume at this point that there are ample resources available in the memory 40, so the process 200 proceeds from step 203 to 204, using spare data block Bs2 in packet Ps1 to store data Bd0. Then, in step 206, memory space to store packet Ps1 is allocated. In step 208, data Bd0 is added to the packet and written back to the packet Ps1 on the track 24 of the optical disk 22. Suppose that during write-in, the data block Bs1 in packet Ps1 is found to be defective, then the process 200 loops back to step 202 processing the defective data block Bs1. Please note that the problem of the defective data block Bd1 is still unsolved, which means that the data packet Ps1 in memory 40 cannot yet be released. After returning to step 203, assume packet Ps1 does not use up too much memory space. Step 204 resumes the defect management, which comprises: using a spare data block Bs5 in a packet Ps2 to replace the defective block Bs1, in step 206 again allocating memory space in memory 40 to store the packet Ps2, and in step 208 adding the block Bs1 to packet Ps2 in temporary memory storage and writing back to track 24. Assuming (as illustrated in FIG. 5) in step 210 a data block Bs4 in the packet Ps2 is found to be defective, the process 200 once again returns to step 202 and 203 for defect management for data block Bs4. At this point the memory 40 is unable to allocate memory space for fresh data packets, the process 200 proceeds from step 203 to 214.

In step 214 the control circuit 38 locates a blank data packet Ps4, which in step 216 allows the packet Ps2 in temporary memory storage to be written to packet Ps4. In other words, the data in every data block of packet Ps2 is written to a corresponding data block of the packet Ps4 on the track 24. Since every data block in packet Ps4 is available (i.e. they have never been used to replace defective data blocks), it is not necessary to read the packet Ps4 to the memory 40 before using it to replace the packet Ps2, storing the original data that was meant for defective block Bs4 to packet Ps4. If during the write-in of step 216 no fresh defect is uncovered in packet Ps4, then the process 200 moves from step 218 to step 212 releasing the memory space taken by packet Ps2 in the memory 40. After which the process 200 can move from step 220 to step 202, thereby conducting defect management on data block Bs1 or Bd1. When taking the approach of using a single data block to manage a defective data block Bs4, as illustrated in the prior art process in FIG. 5, it is necessary to allocate a memory space to accommodate a data packet by reading a packet Ps3 to the memory 20. By contrast, in FIG. 8 no memory allocation is needed in memory 40 to tackle the defective data block Bs4 in steps 214 and 216.

Figure 9:
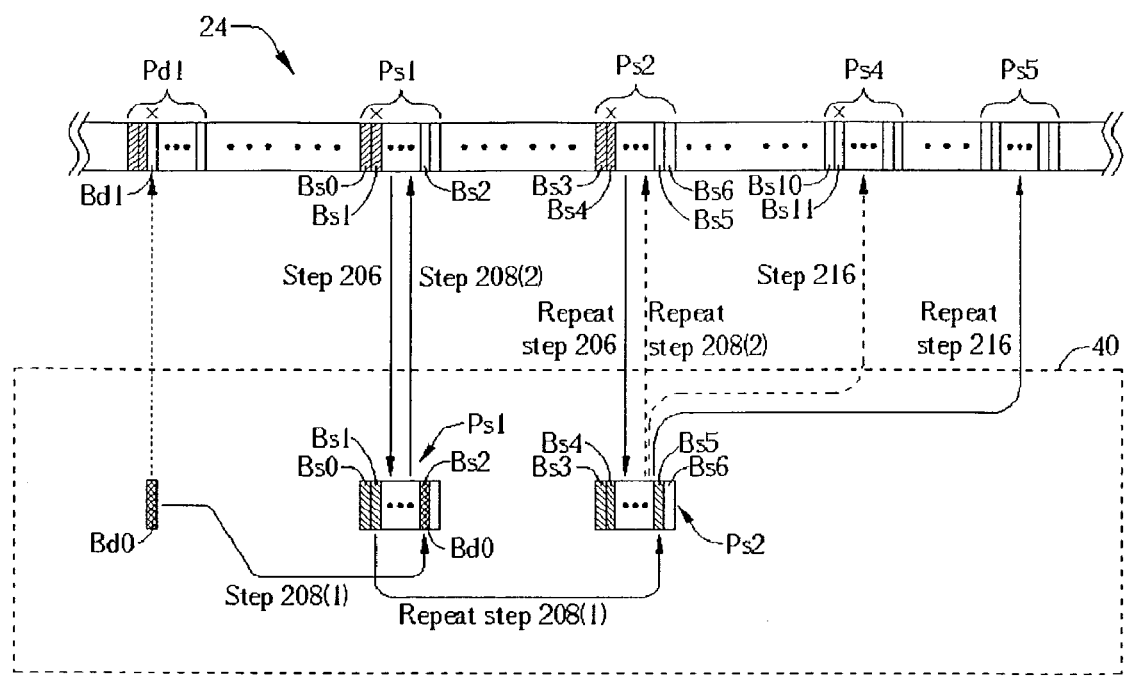

If in the process 200, during write-in from temporary storage Ps2 to packet Ps4 in track 24, one of the data blocks in packet Ps4 is found to be defective, the process 200 would go from step 218 to step 214 trying to locate an entire packet that is available. Please refer to FIG. 9, which illustrates what occurs when the process 200 returns from step 218 back to step 214. As illustrated by FIG. 9, when step 218 uncovers that a data block Bs11 in Ps4 is defective, the process 200 returns to step 214, trying to locate a packet having all data blocks available. Assume that step 214 locates a packet Ps5, then step 216 does not need to read the packet Ps5 to the memory 40, instead simply writing packet Ps2 to packet Ps5. In other words, in case of a memory shortage steps 214, 216, and 218 of the present invention method do not resort to taking up memory space when finding a fresh defective data block. Instead, the present invention searches for an entire data packet to replace the packet that is in temporary memory 40 storage, and directly writes the packet to an optical disk.

The prior art defect management method for optical disks uses a single spare data block to replace a single defective data block. However, to accommodate the write-in format for optical disk drives, which operate on units of data packets, it is necessary to allocate memory space in the optical disk drive for a data packet. However, the case of multiple defects on an optical disk causes a significant drain on memory resources resulting in a lowering of defect management capability and adversely affecting the operation of an optical disk drive. By contrast, the present invention uses a single spare data block to replace a single defective data block when memory resources are ample; and in the case of a memory shortage the present invention switches to the approach of using a data packet to replace a data packet, thereby saving memory resources and allowing defect management to continue. Further more, if defect blocks occur frequently in a packet, the present invention can reduce read-write activity required for defect management. For example, if 31 data blocks within in a packet are defective, 31 times of read-write must be performed in the prior art, each time a replacing sparse block (and the sparse packet it belongs to) is read in the memory, then it has to be written back to the optical disk thus defect management for a defect block is performed. However, in the present invention, an empty (not used to replace any other defect blocks) sparse packet is found to replace all the 31 defect blocks within the packet. Thus the sparse packet does not need to be read in the memory, and a single write action can complete defect management required for all the 31 defect blocks. Therefore, the defect management method of the present invention is more efficient than the prior art. Since the present invention also reduces requirement for writing data back to the optical disk, it can make the optical disk more durable.

It is claimed that this invention is capable of effectively maintaining the defect management mechanism and retaining the write-in capability of an optical disk while at the same time preserving the memory resources and operation efficiency of the optical disk drive.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method for managing defects on an optical disk, the optical disk comprising a plurality of packets, each of the packets comprising a plurality of data blocks for recording data, the method comprising:

writing a piece of first data and at least a piece of second data recorded on the optical disk onto a second packet of the optical disk when the piece of the first data is prepared to be written onto a first data block of a first packet and the first data block is defective, wherein there are at least two writable data blocks of the second packet that do not record the piece of first data or the piece of second data so that there are at least two pieces of data recorded on the second packet changed after the piece of first data and the piece of second data are written onto the second packet.

2. The method of claim 1 wherein the optical disk comprises a plurality of data areas and a plurality of spare areas for recording data, each of the data areas and the spare areas comprises a predetermined number of the packets, the second packet is included in one of the spare areas, and each of the spare areas comprises a plurality of spare data blocks, each of the spare data blocks is used to record a corresponding piece of data, which is prepared to be written onto a defective data block of one of the data areas.

3. The method of claim 2 wherein the first packet is included in one of the data areas.

4. The method of claim 2 wherein the first packet is included in one of the spare areas.

5. The method of claim 1 is used to control operations of an optical disk drive, wherein the optical disk drive is capable of writing data onto the optical disk and determining which one of the data blocks is defective, the optical disk drive comprises a memory for storing data, the piece of first data and the piece of second data are recorded on an original packet of the optical disk, and the method further comprising:

storing the pieces of data recorded on the data blocks of the original packet in the memory;

wherein the piece of first data and the piece of second data are written onto the second packet according to the pieces of data stored in the memory.

6. The method of claim 5 wherein all of the data blocks of the second packet are writable, and when the optical disk drive writes data onto the second packet, each piece of the data blocks of the original packet stored in the memory is respectively written on to a corresponding data block of the second packet.

7. The method of claim 6 further comprising:

if a remaining capacity of the memory is larger than a predetermined value, storing the pieces of data recorded on the data blocks of the second packet in the memory, and writing the piece of first data onto the second packet according to the data stored in the memory and avoiding writing the piece of second data onto the second packet.

8. The method of claim 6 wherein the predetermined value is larger than a total capacity of one of the packets.

9. The method of claim 5 further comprising:

writing the piece of first data and the piece of second data onto the second packet when the first data block is defective if a remaining capacity of the memory is less than a predetermined value.

10. The method of claim 5 wherein each of the data blocks of the optical disk has a corresponding unique address, and the optical disk further comprises a defect table for recording the addresses of the defective data blocks, the method further comprising:

writing the addresses of the two data blocks that record the piece of first data and the piece second data onto the defect table.

* * * * *